Nov. 7, 1961 T. F. PETERSON 3,007,300
HELICALLY-PREFORMED WIRE ENVELOPE AND METHODS OF USE
Filed Sept. 20, 1946 4 Sheets-Sheet 1
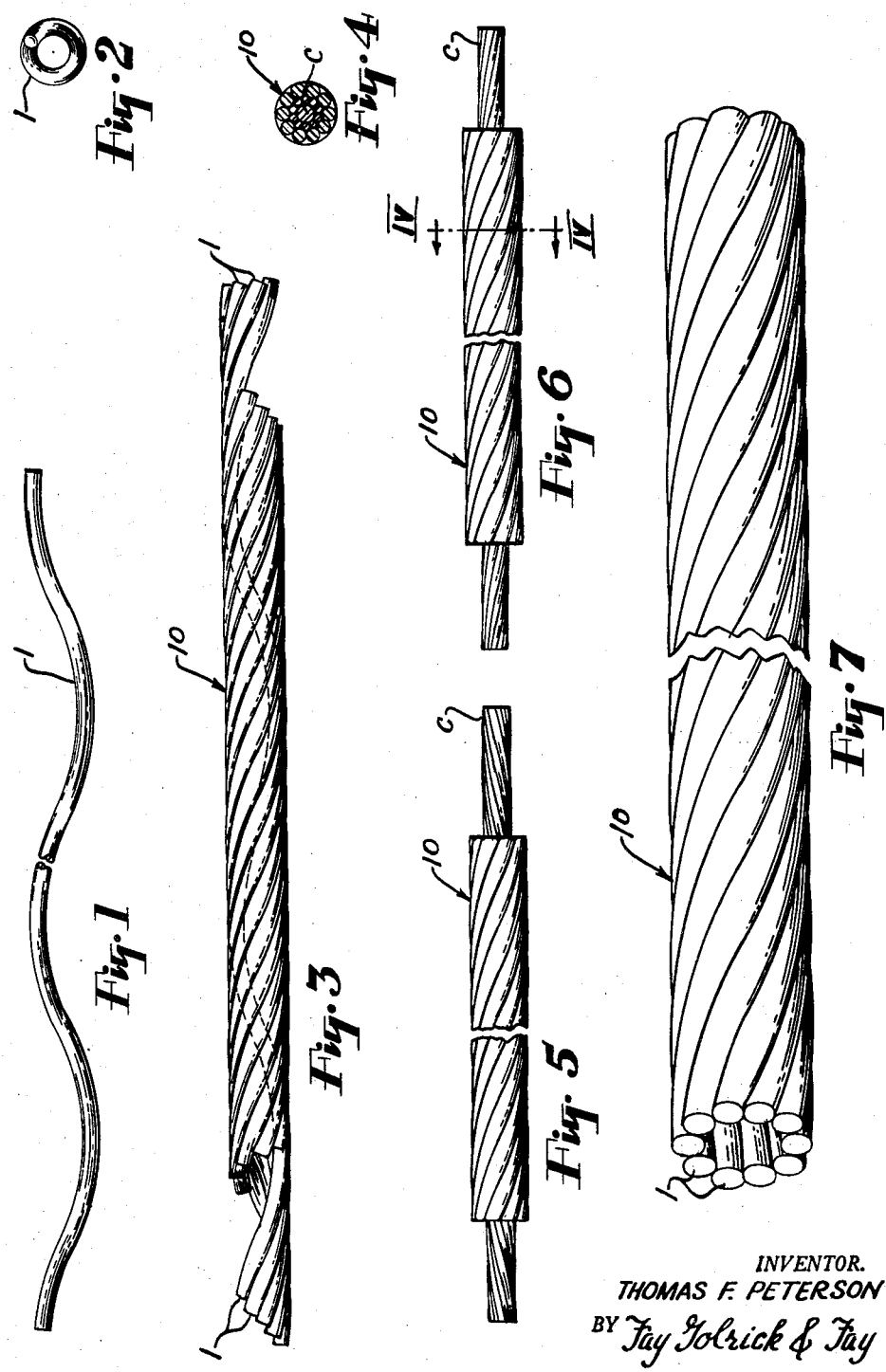
INVENTOR.
THOMAS F. PETERSON
BY Fay Goldrick & Fay
ATTORNEYS

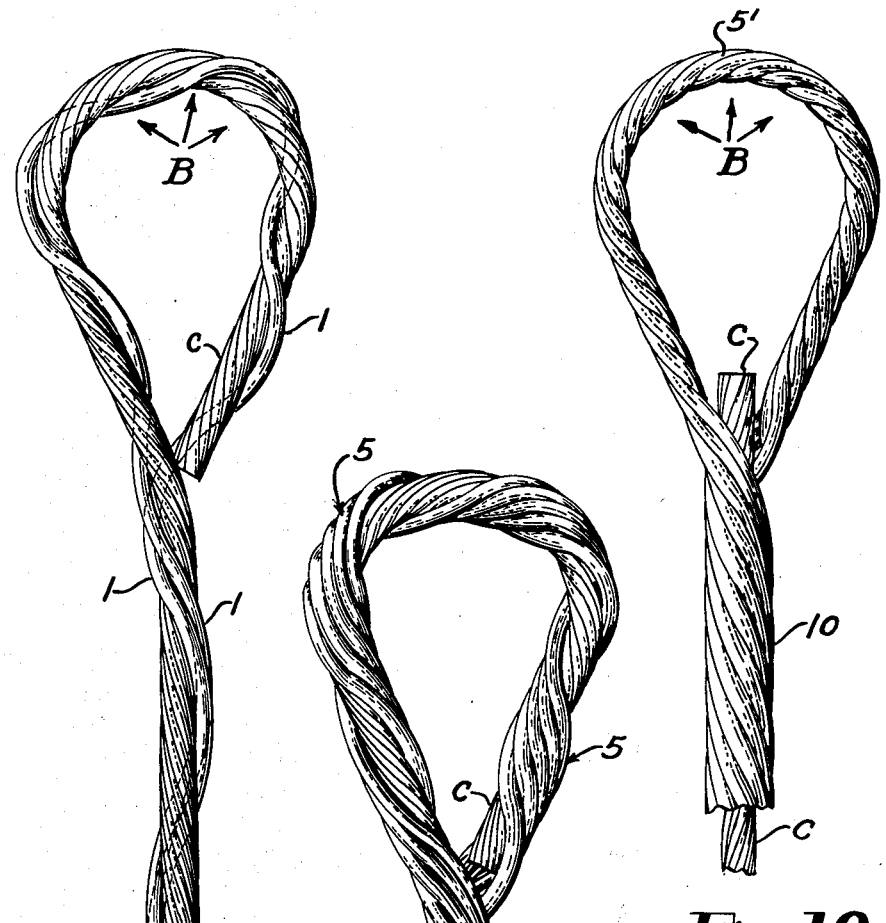

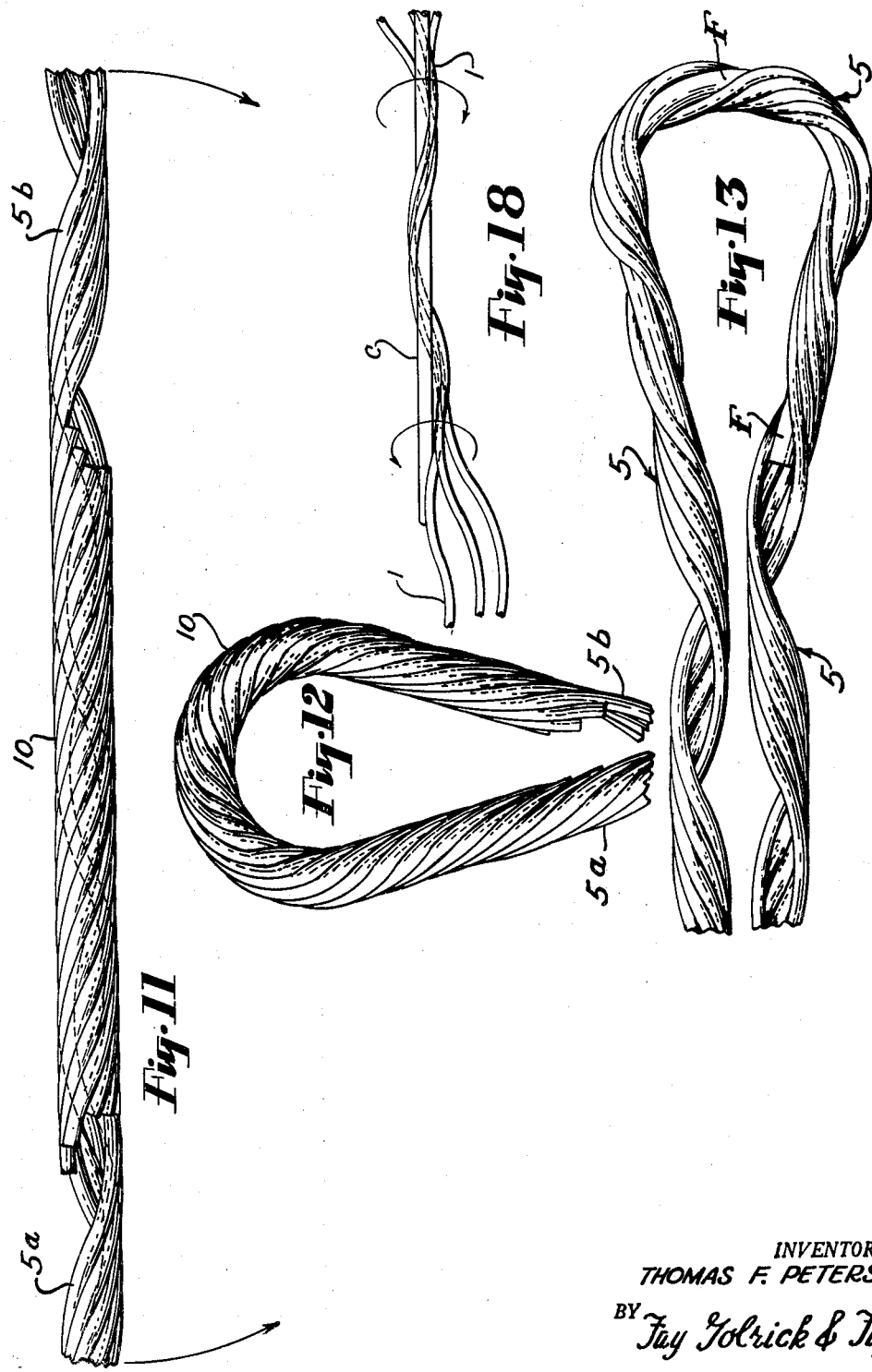

Nov. 7, 1961 T. F. PETERSON 3,007,300
HELICALLY-PREFORMED WIRE ENVELOPE AND METHODS OF USE
Filed Sept. 20, 1946 4 Sheets-Sheet 4

INVENTOR.
THOMAS F. PETERSON
BY *Fay Golrick & Fay*
ATTORNEYS

United States Patent Office 3,007,300
Patented Nov. 7, 1961

3,007,300
HELICALLY-PREFORMED WIRE ENVELOPE AND METHODS OF USE
Thomas F. Peterson, Shaker Heights, Ohio, assignor to Preformed Line Products Company, Cleveland, Ohio, a corporation of Ohio
Filed Sept 20, 1946, Ser. No. 698,312
1 Claim. (Cl. 57—145)

This invention stems from those disclosed in my prior Patent No. 2,275,019 and co-pending application Serial No. 601,245, filed June 23, 1945, now Patent No. 2,587,521, both entitled "Cable Reinforcement." Whereas, in those prior cases, the reinforcements of wire depended upon a central wire or cable upon which the component helices were disposed for their assembled form, in the instant case, the component helices are preformed and twisted together into a sturdy envelope, tube or conduit, which retains its form without regard to any support from within.

The objects and purposes of the present invention are, accordingly, the provision of:

An envelope, armor, casing, conduit, tube, or the like, composed of helically-preformed elements or filamentary bodies of sufficient stiffness to be twisted or intertwined together to form such envelope, and of a pitch to enable the preformed helices to be applied to enclose any elongated element of a diameter substantially equal to or less than the internal diameter of such helices. Where the ends of such elements are not readily available for threading through the helices, the limit of elasticity of the latter is not exceeded in the side application thereof.

A flexible tube or armor for any desired use.

A reinforcement for wires, ropes, strands and cables.

A connector for adjacent ends of wires, ropes, strands and cables.

An electrical connector between the opposed ends of an electrical conductor, of low resistance and low magnetic loss charcteristics.

An electrostatic shield for conductors.

A device in any of the uses described above in which extraneous clamps, fastenings or lashings are obviated.

A dead end for wire strands, cables and ropes.

An extensible body utilizable for purposes comparable to elongate, telescopic members, such as automobile antennae, tripod legs, gauges, and the like.

Tubular handles.

Tubular handles having a bight formed thereon in the manner of dead-ends, beaters, dashers, etc., especially where some flexibility is desired.

A reinforcement predominately of helical components having straight portions intermediate their ends in registering or nesting relationship to provide a rigid, inflexible support at such portions which is self-retaining.

A device as in the foregoing paragraph in which the lay of the helices at each side of a straight portion are the same or the reverse with respect to each other.

An abrasion resistant armor for electrical conductors.

A conduit that may be assembled, in situ, to encase brake rods, push rods, control cables, etc., and which may be socketed and permanently fastened after assembling.

Other objects and advantages will become apparent hereinafter when the specification is read in conjunction with the accompanying drawings, in which FIGS. 1 and 2 are side and end views, respectively, of one of the helically-preformed elements characteristic of the present invention;

FIG. 3 is a tubular body, shown in side elevation, composed of the elements of FIG. 1;

FIG. 4 is a cross-sectional view of a tube similar to that shown in FIG. 3 illustrated as applied to a cable and which corresponds to section IV—IV of FIG. 6;

FIGS. 5 and 6 are side views of the tube or envelope as illustrated in FIG. 3 applied to cables or the like; the direction of lay of the envelope of FIG. 5 is the reverse of the lay of the cable, while the direction of lay of that of FIG. 6 is the same as that of the cable;

FIG. 7 is a perspective view, shown somewhat enlarged, of a tube or envelope made in accordance with the present invention;

FIG. 8 is an elevational view of a cable dead-end as formed by the application of one of the preformed helical elements shown in FIG. 1;

FIG. 9 is a view corresponding to FIG. 8 in which a sufficient number of the helically-preformed elements are applied to the cable completely to enclose the same except in the bight portions, where the elements provide 50 percent or half-lay coverage;

Figure 14:
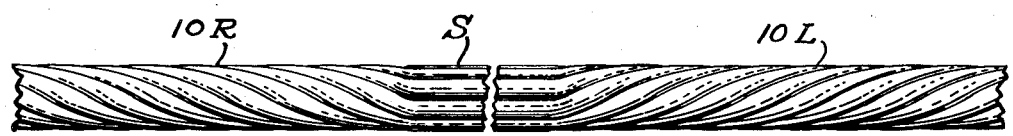
Figure 15:
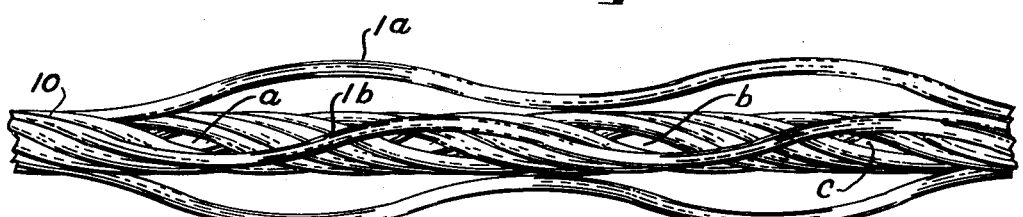
Figure 16:
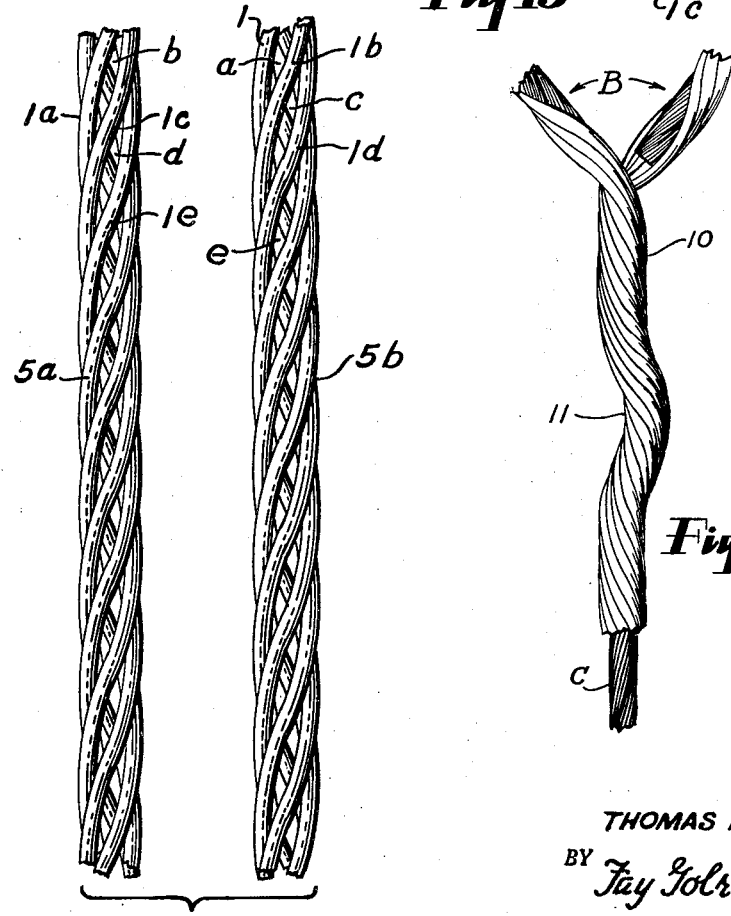

In FIG. 10 the cable does not extend through the bight and the half lay of helically-preformed elements are twisted to provide a reduced closed lay;

FIGS. 11 to 13 inclusive, are side elevational views illustrating other methods of forming dead-ends in accordance with the present invention;

FIG. 14 is a side elevational view of a modified form of the invention;

FIG. 15 illustrates a method of rigidifying a tube or envelope made in accordance with the present invention;

FIG. 16 is illustrative of the detail for associating two half-lays of helically-preformed elements by way of modification over that previously described.

Figure 17:

FIG. 17 is a fragmentary elevational view of a dead end modified to augment its gripping power; and FIG. 18 is a schematic representation of the side application of a plurality of helically-preformed elements to an elongated member of wire, cable, etc.

Referring more particularly to the drawings, in which like reference characters refer to like parts throughout, it has been discovered that helically-preformed elements similar to 1 in FIG. 1 may be preformed to the same helices pitch and lay out of any suitable material, such as round wire, plastic, or the like, and then be intertwisted together to form a closed envelope 10, as shown in FIG. 3, without the necessity of providing any support from within, as has heretofore been the case. As so formed, the helically-preformed elements may be displaced axially relative to each other in order to effect the extension of the envelope for a distance equal to twice its length, or such greater distance as may be effected with regard to the retention of a sufficient over-lapping of two or more elements throughout the body to preserve a mutual support. In this form, and by such usage, the invention finds application in fields where heretofore telescopic members have usually been employed, as for instance in the construction of automobile antennae, tripod legs, etc.

Since the elements 1 may be assembled to form the envelope 10 by grouping them together coextensively and by twisting them relative to each other until each assumes its respective place in the lay of the envelope, it is obvious that they may be applied to enclose elongated members having an over-all diameter adapted to be enclosed by the envelope without regard to the availability of the ends of such member for threading through the helix. Thus, as shown in FIG. 18, for wires or cables C already installed, or for brake rods or other motion transmission means already in place, the elements 1 are held adjacent their middles against the member C and their ends are twisted as shown in the arrows until completely in place. The resulting envelope 10 of this invention affords readily available means which may be quickly and economically installed around such cables or rods and fastened in place without disturbing the pre-existent arrangement.

As illustrated in FIGS. 5 and 6, the envelope 10 may be applied to cables or other elongated bodies in the same manner as that described in the preceding paragraph. Where the internal diameter of the envelope 10 is the same or slightly smaller than the external diameter of the cable C, about which it is to be disposed, an effective mechanical gripping action is realized which serves effectively to splice contiguous ends of wires, cables, etc., so as to resist axial displacement thereof. Where the envelope 10 is of electrically conducting material, an effective electrical joint is provided having low magnetic loss characteristics, such as usually characterize prevailing types of electrical splices which must employ extraneous clamps or fastenings from which electrical losses are realized. As exemplified in FIGS. 5 and 6, it is immaterial whether the lay of the envelope 10 agrees with its associate cable C or not. For greater mechanical and electrical contact, however, the lay of the envelope should agree with that of the cable in order that the elements 1 may be accommodated between the strands of the latter so as to afford maximum line contact.

In FIG. 8 there is illustrated one manner of employing a helically preformed element 1 to secure a bight in the end of a cable or strand after the manner of providing dead-ends therefor. The element 1 is disposed upon the end of a cable C so that half of its extent is secured to the cable and its remaining half extends beyond the end thereof. Then, with the cable bent back upon itself to form bight B, the element 1 is wrapped about the cable contiguously with its starting end, thus to secure the bight in position.

In FIG. 9 a sufficient number of elements 1 have been provided completely to enclose the cable as at 10, while the bight portion thereof is engaged by a half-lay 5 of such elements. In practice, a half-lay would be installed upon the cable C after the manner of element 1 in FIG. 8 so that when it is returned upon itself the two legs of the half-lay 5 are intertwisted about the cable to provide a closed lay 10, as shown in this figure.

Where it is undesirable to dispose the cable C within the bight an arrangement similar to that shown in FIG. 10 may be employed. A half-lay of the helically-preformed elements is disposed around the cable 10 for approximately one-third to one-half of its length, with the remaining portion extending beyond the cable. That portion of the half-lay which is to form the bight may be pre-twisted to form a closed lay 5' for an extent of its length equal to the extent of the bight. The returned half-lay may then be intertwisted with itself about the cable C to provide the whole-lay 10, as shown.

Further modifications are illustrated in FIGS. 11 and 12, in which two half-lays 5a and 5b are overlapped and intertwisted to provide a closed lay 10. The two half-lays 5a and 5b are then bent downwardly so as to dispose the whole-lay 10 as a bight between them. This disposition is illustrated in FIG. 12. The two lays 5a and 5b may then be intertwisted from the bight portion to the limit of their coextensiveness to provide a whole-lay dead-end throughout the entire construction. A cable or other line to be dead-ended may be disposed in the arrangements of FIGS. 11 and 12, in the same manner as that shown in either FIG. 9 or FIG. 10.

As a modification of this, a single half-lay may be provided in which another section of half-lay may be intertwisted to form a closed bight portion. In this case, the second half-lay will be relatively short in extent and should not be longer than required to constitute the bight per se.

In FIG. 13 another manner of treating a half-lay dead-end is illustrated by the use of a half-lay 5, which may be predisposed about a cable in a manner similar to that already described in connection with FIG. 10. However, instead of twisting the half-lay into a reduced whole-lay 5', as in the latter figure, a filler F of cable, of marline, hemp, or other line, may be employed within the bight portion which closes the half-lay and imparts flexibility and support at the bight.

In some cases it is desirable to provide a greater stiffness or rigidity of the envelope than can be had from an entirely helical disposition of its components. This may be achieved by providing registering and complementary straight portions S intermediate the ends of the helically-preformed elements, as shown in FIG. 14. Where the envelope is serving as a reinforcement for cables, overhead transmission lines, etc., the internal diameter of the helices will be such as tightly to grip the conductor for a substantial distance upon each side of the straight portion S. In other cases, it might be desirable to have the lays of the reinforcement upon opposite sides of the straight portion S reversed to one another so that any one of the component helices may be applied to a cable by holding its ends thereagainst and turning its middle about the conductor until its snaps in place. Sufficient helices to provide a closed envelope may be applied in a similar manner. Thus, in FIG. 14 is illustrated such an envelope having a central straight portion S and right lay portion 10R to one side of the straight portion S and left lay portion 10L to the other side thereof.

A further means of providing increased rigidity, and for added damping and gripping, is illustrated in FIG. 15. Here, one or more of the helically preformed elements, shown as 1a, 1b and 1c, are diverted from their normal position in the lay of the envelope 10 to provide blank lays a, b and c. The diverted elements are extended along the sides of the envelope for a distance of at least one pitch length and, if necessary, several pitch lengths, until each again comes into a position of registration with the blank lay it had been forced to vacate, at which point it may be returned to assume its respective normal position in the lay. By this means the elements represented by 1a, 1b and 1c become tension and compression elements to resist flexing of the envelope incident to the bending of the helical axis. This effect may be localized to one side of the envelope by utilizing one, or two adjacent elements, if more than one, or a cage effect may be obtained by displacing the elements in this manner entirely around the cable, as shown in FIG. 15.

In order to prevent the end of the cable, as shown in FIG. 10, from splitting the whole lay 10 by accidentally or otherwise being pulled down between the union of the legs of the bight, a different manner of associating the elements of the half lays may be used, as is illustrated in FIG. 16. It will be recognized that a cable disposed as in FIG. 10 could effect the dissociation of the half lays where they are arranged as in FIG. 13 to form the whole-lay 10. However, if, instead of taking the strands of the half-lay in a contiguous group, as shown in FIG. 13, they are so spaced that the elements which constitute the half-lay of the bight can be intertwisted alternately among the two legs, then a whole-lay may be provided which is not subject to splitting as mentioned above. Thus, in FIG. 16 two half-lay legs 5a and 5b have been depicted, it being assumed that each extends from its respective side of a bight portion similar to that shown in FIG. 9 or FIG. 12. As arranged in this figure, element 1a of the leg 5a would lie between the element 1 and the element 1b of the leg 5b, thus to occupy the vacant lay a. Similarly, element 1b of the leg 5b would occupy the vacant lay b in the leg 5a, which occurs between the elements 1a and 1c. Similarly, 1c of leg 5a would lie in the vacant lay c of leg 5b. Lay 1d of leg 5b would occupy lay d of leg 5a, and so on until each of the elements is accommodated and a whole-lay similar to any illustrated in these views and marked by the numeral 10 is provided.

In order to increase the holding power of the envelopes 10 when used as splices or dead ends, a suitable grit or abrasive, such as aluminum oxide, Carborundum, etc., usually in a suitable liquid vehicle, may be applied between the envelope and the underlying body. Another means for effecting this result is illustrated in FIG. 17 where a dead end has been shown. The envelope 10 is crimped, as at 11, to increase the modulus of friction upon the cable C. This may be done after installation by a suitable tool, in which case the cable, as well as the envelope, will be off-set, or it may be accomplished by preforming the off-set in the helices during manufacture or before installing them, so that when applied to the cable, the latter is made to conform, or to tend to conform, to the off-set portion. Considerable added resistance to axial displacement is thus realized.

Furthermore, the cross-sectional configuration of the elements is not essential, although it is less obvious that round sections will serve in the manner described and since these are usually the most readily available and economic to produce it is expected that they will have the widest application.

With due consideration being given the degree of rigidity required which will vary among the several uses, the helically-preformed elements may be composed of any suitable material, whether metal, plastic or otherwise, which best suits it to its intended use.

I claim:

The method of forming a hollow body from helically-preformed elements which comprises shaping said elements into conforming helical patterns of individual cut-lengths, grouping said elements so that they are, at least in part, relatively coextensive, and intertwisting said elements together uniformly to disposed them about a common axis.

References Cited in the file of this patent

UNITED STATES PATENTS

| | | |
|---|---|---|
| 337,513 | Moxham | Mar. 9, 1886 |
| 468,293 | Coleman | Feb. 2, 1892 |
| 475,889 | Preston | May 31, 1892 |
| 1,686,250 | Page | Oct. 2, 1928 |
| 1,996,689 | Rohs | Apr. 2, 1935 |
| 2,136,388 | Lowe | Nov. 15, 1938 |
| 2,230,611 | Coffin et al. | Feb. 4, 1941 |
| 2,275,019 | Peterson | Mar. 3, 1942 |
| 2,414,045 | Kitselman et al. | Jan. 7, 1947 |
| 2,414,136 | Bodendieck | Jan. 14, 1947 |

FOREIGN PATENTS

| | | |
|---|---|---|
| 34,144 | Denmark | Feb. 2, 1925 |

OTHER REFERENCES

"P.F.T.—Preformed Armor Rods and Multiple Wire Ties," Americal Steel and Wire Company of New Jersey, 1946.